United States Patent Office 3,356,636
Patented Dec. 5, 1967

3,356,636
PRODUCTION OF FAST FLOWING POLYAMIDES
Anton Cadus, Ludwigshafen (Rhine), Germany, assignor to Badische Anilin- & Soda-Fabrik Aktiengesellschaft, Ludwigshafen (Rhine), Germany
No Drawing. Filed Sept. 20, 1965, Ser. No. 488,800
Claims priority, application Germany, Sept. 30, 1964, B 78,729
4 Claims. (Cl. 260—33.4)

ABSTRACT OF THE DISCLOSURE

Process for producing fast flowing polyamides by kneading polyamide masses at 180–350° C. with 0.05–2.5% of an acetylene compound having an acetylene triple bond and an oxygen atom and a standard pressure boiling point between 100° C. and 350° C., such as butynediol-1,4, ethynylcyclohexanol, dehydroneolidol, dehydrolinalool, propargyl alcohol, dehydroisophytol and methoxydehydrolinalool.

---

This invention relates to a process for the production of fast flowing polyamides in which polyamides are kneaded with organic acetylene compounds whose boiling points under standard temperature and pressure are above 100° C.

In the mass production by injection molding of articles from polyamides, for example gear wheels, short injection cycles are desirable.

It is known that the flow of polyamides can be improved by increasing the processing temperature or by adding lubricants, mold release agents or crystallization accelerators to the polyamides. By this method, either the flow is not improved to a satisfactory extent or the mechanical properties of the polyamides are impaired.

It is also known that the flow of polyamides can be improved by kneading them with free radical forming compounds. Working with free radical forming substances is dangerous because of the explosive nature of these substances. Moreover some of the added dyes are attacked by the formation of free radicals. To avoid this, the production of colored polyamides by this method has to be carried out in two operations, the polyamides being kneaded with the free radical forming substances in the first stage and coloring being effected in the second stage.

We have now found that fast flowing polyamides can be advantageously prepared by kneading polyamides with substances which improve their flow, by using organic acetylene compounds whose boiling points at standard temperature and pressure are higher than 100° C. as the compounds for improving flow. Acetylene compounds whose boiling points are between 150° and 350° C. are particularly suitable. These compounds undergo practically no decomposition when heated for a short time to the melting temperature of the polyamide during kneading.

Examples of suitable acetylene compounds are butynediol-1,4, ethynylcyclohexanol, dehydroneolidol, dehydrolinalool, propargyl alcohol, dehydroisophytol and methoxydehydrolinalool. The acetylene compounds may be prepared by conventional methods, for example by vinylation of aldehydes or ketones with or without partial dehydrogenation. They are advantageously used in amounts of 0.05 to 2.5% by weight with reference to polyamide.

According to this invention, the polyamides are kneaded with the acetylene compounds, in the presence or absence of conventional additives. For this purpose the polyamides and the acetylene compounds, together with any other conventional additives, may first be mixed in the solid condition and then homogenized via a melt. The acetylene compounds may however be added (with any other additives) to the partly plasticized or completely molten polyamide composition. The temperatures during kneading are between 180° and 350° C., preferably between 200° and 320° C. Machines which are suitable for kneading are particularly single or multi shaft screw extruders or multi shaft disc kneaders. The residence time of the polyamides in the kneader is usually about forty seconds to two minutes. The shear stresses occurring in suitable machines are from 0.8 to $2.5 \times 10^3$ kg./sq. cm. The velocity gradients occurring during kneading are advantageously from 10 to 2000 sec.$^{-1}$ and more.

The new polyamides are practically colorless and have not only outstanding mechanical properties but also good flow. Colored fast flowing polyamides may now be prepared in one stage. This result is surprising because it would have been expected (a) that the polyamides, owing to their sensitivity to oxygen, would be discolored by the high temperatures and (b) that the acetylene compounds would react with the polyamides to form crosslinked highly viscous products which would be difficult to process.

Examples of polyamides whose flow can be improved according to this invention are polylactams of lactams having six to twelve ring carbon atoms, such as caprolactam, capryllactam or laurolactam, and polycondensates of dicarboxylic acids and diamines, such as adipic acid, sebacic acid or heptadecane dicarboxylic acid, and hexamethylene diamine, octamethylene diamine, decamethylene diamine, dodecamethylene diamine or 2,4-di-(aminomethyl)-toluene. The polyamides are prepared by conventional methods. They have K-values which are advantageously from 65 to 100, preferably from 70 to 90.

Examples of suitable additives which may be incorporated into the polyamides in addition to the acetylene compounds are dyes, fillers, stabilizers, lubricants, mold release agents or crystallization accelerators.

Polyamides prepared in accordance with this invention are suitable for example for the production of moldings by extrusion or of films by blow molding, and for the production of molded materials, such as fibers, filaments, threads or bristles.

The invention is further illustrated by the following examples in which the parts given are by weight. K-values are determined in the conventional way according to Fikentscher (Cellulosechemie, 13 (1932) 60) in concentrated sulfuric acid in 1% solution at 25° C.

Example 1

100 parts of polycaprolactam (K-value 72.8) is mixed in an intensive mixer with 0.3 part of ethynylcyclohexanol (boiling point at 20 mm. Hg, 85° C.), 0.3 part of calcium stearate and 0.1 part of nylon-2,2 and intensely kneaded on a double screw extruder for sixty to ninety seconds at 220° to 280° C. The product is granulated and dried by conventional methods and injection molded to form moldings having a tensile strength of 720 kg./sq. cm.; surface hardness is 15% higher than that of the starting material and the injection molding temperature for the same cycle time is 5° C. lower.

Example 2

100 parts of polycaprolactam (K-value 73.6) is mixed in an intensive mixer with 0.5 part of calcium stearate, 0.1 part of nylon-2,2, 0.2 part of Kerobit and 0.5 part of methoxydehydrolinalool (boiling point 84° C. at 2 mm. Hg) and then kneaded for sixty to eighty seconds at 200° to 270° C. in a twin screw extruder, extruded and granulated. The granulate is dried to a water content of less than 0.1% and injection molded in the conventional way.

The tensile strength of the moldings is 780 kg./sq. cm. The surface hardness is about 20% higher than that of polyamide moldings which have not been treated with acetylene compounds. The injection temperature for the same cycle time is 6° C. lower than that of untreated polycaprolactam.

*Example 3*

100 parts of nylon-6,6 (K-value 72.5) is intensely mixed in a mixer with 0.5 part of ethynylcyclohexanol and 0.1 part of nylon-2,2 and also 0.3 part of cadmium sulfide for twenty seconds, kneaded for sixty to one hundred seconds at 260° to 300° C. in a twin screw extruder, extruded, granulated and dried. The K-value at 72.1 is practically unchanged from that of the starting polyamide. Test specimens prepared from the granulate have a tensile strength of 850 kg./sq. cm., a notched impact strength of more than 2 and a surface hardness of 1750 kg./sq. cm. The injection temperature for the same cycle time is 6° C. lower than that of untreated nylon-6,6.

*Example 4*

100 parts of nylon-6,10 (K-value 70.4) is mixed with 20.4 parts of dehydroisophytol (boiling point 133° C. at 0.8 mm. Hg), 0.5 part of calcium stearate, 0.1 part of nylon-2,2 and 0.08 part of Heliogenblau (halogenated copper phthalocyanine), homogenized in a twin screw extruder at 230° to 270° C., extruded, granulated and dried. The average residence time of the polyamide in the extruder is seventy to one hundred and ten seconds. The K-value of the granulated polyamide is 70.1; it may be injection molded in a rapid cycle and molded quickly and without difficulty.

I claim:

1. A process for the production of fast flowing polyamides which comprises kneading polyamides having a K-value within the range of from 65 to 100 at temperatures between 180 and 350° C. with 0.05 to 2.5% by weight with reference to said polyamides of an acetylene compound containing a —C≡C— group and at least one oxygen atom in the molecule and having a boiling point above 100° C. at standard pressure.

2. A process for the production of fast flowing polyamides which comprises kneading polyamides having a K-value within the range of from 65 to 100 at temperatures between 180 and 350° C. with 0.05 to 2.5% by weight with reference to said polyamides of an alcohol containing at least one —C≡C— group and having a boiling point above 100° C. at standard pressure.

3. A process as claimed in claim 2, wherein said alcohol is ethynylcyclohexanol.

4. A process as claimed in claim 2, wherein said alcohol is butynediol-1,4.

References Cited

UNITED STATES PATENTS 3,135,710   6/1964   De Benneville ------ 260—33.4

FOREIGN PATENTS 1,068,887   4/1960   Germany.

MORRIS LIEBMAN, *Primary Examiner.*

L. T. JACOB, *Assistant Examiner.*